United States Patent [19]

Vo-Than et al.

[11] Patent Number: 4,902,759
[45] Date of Patent: Feb. 20, 1990

[54] COATING COMPOSITION FOR USE IN PREPARING METALLIZED ARTICLES

[75] Inventors: Maurice Vo-Than, Montmagny; George Chavasset, Courbevoie, both of France

[73] Assignee: Holden Europe SA, Caudebec les Elbeuf, France

[21] Appl. No.: 318,478

[22] Filed: Mar. 3, 1989

Related U.S. Application Data

[63] Continuation of Ser. No. 48,354, May 11, 1987, abandoned.

[30] Foreign Application Priority Data

May 9, 1986 [FR] France .................................. 86 06698

[51] Int. Cl.$^4$ .............................................. C08L 63/00
[52] U.S. Cl. .................................... 525/481; 525/485; 525/523
[58] Field of Search ........................ 525/481, 523, 485

[56] References Cited

U.S. PATENT DOCUMENTS

| | | | |
|---|---|---|---|
| 4,342,852 | 8/1982 | Takeda et al. | 525/481 |
| 4,367,318 | 1/1983 | Ishimura et al. | 525/481 |
| 4,611,036 | 9/1986 | Sekiguchi et al. | 525/481 |

Primary Examiner—Theodore E. Pertilla
Attorney, Agent, or Firm—Cushman, Darby & Cushman

[57] ABSTRACT

According to the present invention there is provided a coating composition comprising from 30% to 70% by weight of a novolac-type phenolic resin having a melting point in the range of 70°–130° C. or resol-type phenolic resin having a gel time of at least 45 to 180 sec. at 180°C.; and 70–30% by weight of a multi-epoxide group containing compound having at least 2 epoxide groups and having an epoxide equivalent weight of 100 to 1200.

6 Claims, No Drawings

COATING COMPOSITION FOR USE IN PREPARING METALLIZED ARTICLES

This is a continuation of Application No. 07/048,354, filed May 11, 1987, now abandoned.

This invention relates to coating compositions, to a process for their preparation and to their use particularly for the preparation of metallized articles.

Coating compositions for use in the manufacture of metallized coatings are known. For example, a polyurethane resin obtained by crosslinking a hydroxylated saturated polyester by means of an adduct based on a masked polyisocyanate and a polyol, together with a polyester-epoxy resin obtained by reacting a carboxylated polyester with an epoxy resin or an epoxy resin hardened by an optionally accelerated or substituted polyamide is disclosed in GB-A-2058141.

We have now discovered a novel coating composition which can be used in the manufacture of metallized articles. The metallized surface obtained has a particularly good optical quality and moreover the metallized layer so produced is particularly stable to heat.

The compositions of this invention can be used for the production of metallized surfaces for decorative purposes, for example metallized parts for cars (in particular, bumpers and window frames), containers and container caps and trophies. The compositions can also be used for preparing optical quality reflectors, for example, mirrors and lamp reflectors (particularly headlamp reflectors for motor vehicles).

According to the present invention there is provided a coating composition comprising from 30% to 70% by weight of a novolac-type phenolic resin having a melting point in the range of 70°-130° C. or resol-type phenolic resin having a gel time of at least 45 to 180 sec. at 180° C.; and 70-30% by weight of a multi-epoxide group containing compound having at least 2 epoxide groups and having an epoxide equivalent weight of 100 to 1200.

Examples of Novolac-type phenolic resins having a melting point in the range of 70°-130° C. are SF 118 (manufactured by Schenectady) Alnoval PN 320, Alnoval PN 430 and Alnoval PN 822. The Alnoval series are manufactured by Hoechst. Preferably the resin is one which has a melting point of less than 120° C. Preferably it has a melting point in the range of 83°-88° C. In particular, it is Alnoval PN 320.

Examples of resol-type phenolic resins having a gel time of 45 to 180 sec. at 180° C. are Rutaphen 7292 LG and BKR 2620 manufactured by Bakelite, and Uranvar 75120 and Uranvar 75190 manufactured by D.S.M.

Preferably the resin has a gel times of at least 60 sec. at 180° C. Preferably it has a gel time in the range of 60-120 sec. at 180° C. In particular the resin is Rutaphen 7292 LG.

The multi-epoxide group-containing compound can be a low molecular weight molecule, for example, triglycidyl isocyanurate which has three epoxide groups, a molecular weight of 322 and an epoxide equivalent weight of 107.

The multi-epoxide group-containing compound can be an epoxy resin based on bis-phenol A and epichlorhydrin or bis-phenol F and epichlorhydrin. Preferably it is based on bis-phenol A and epichlor- hydrin. Preferably the epoxide equivalent weight is at least 500 and is less than 1000. Preferably the resin has a softening point between 50° and 100° C.

More particularly, the epoxy resin is one having an epoxide equivalent weight of 605 to 645 and a softening point between 59° and 65° C.

Examples of epoxy resins of this type are Araldite GT 7072 (equivalent weight 570-595; softening point 55°-65° C.), Araldite GT 7203 (equivalent weight 605-645; softening point 59°-65° C.), and DER 663U (equivalent weight 730-840; softening point 88°-98° C.) and DER 664U (equivalent weight 875-975; softening point 95°-105° C.).

The Araldite GT resins referred to are manufactured by CIBA-Geigy. The DER resins referred to are manufactured by the Dow Chemical Company. Preferably the resin is Araldite GT7203.

The compositions can also contain other additives which facilitate the coating process, for example, an air release agent, in particular benzoine, a flow agent, in particular Acronal 4F, Modaflow and BYK Powderflow, a catalyst for the epoxide/phenol reaction, for example, Rutapox VE260.

Benzoine is available from Rhone-Poulenc. Acronal 4F is available from BASF. Modaflow is available from Monsanto and BYK Powderflow is available from BYK-Goulden-Lomberg.

The compositions can be prepared by conventional processes. For example, the ingredients can be mixed dry and melted as they are extruded by a single or twin feed extruder. The extrudate is then pressed and allowed to harden. The hard material is then milled into a powder using a hammer mill or a ball mill.

The compositions can be used to form a metallized coating on an article by depositing on a surface of the article, a film of the composition, allowing the film to cure, subjecting the cured coating to a corona discharge and thereafter flash metallizing the cured coating.

The coating composition, which is in the form of a powder, can be applied by any standard powder coating technique. For example, it can be sprayed with a gun, especially an electrostatic gun, or it can be applied from an electrostatic fluidised bed. In practice the coating is applied in a thickness of at least 40 microns. In practice the thickness of the coating will not exceed 150 microns. Preferably it is from 80-120 microns.

Preferably the curing process is facilitated by baking the coated article. The temperature and the time for which the article is baked depends upon the material from which it is manufactured. The article will be heated to a temperature at which curing is promoted but less than that at which distortion occurs. In general, the temperature is at least 200° C. Where the article is made from sheet moulding compound, it is baked at 220° C. for about 30 minutes. Where the article is metal it is heated to about 230° C. for about 20 minutes.

Some plastic materials are conductive. These can be coated electrostatically. For non-conductive electrostatic materials, the article to be coated is pre-heated to a temperature above the melting point of the powder to facilitate the coating process.

Where appropriate, the coating can be subjected to UV radiation to promote curing.

When the coating has cured, the article is subjected to a corona discharge and low pressure. The discharge is carried out from 1-3 minutes at a pressure of less than $10^{-2}$ mm Hg, and preferably at a pressure of below $10^{-4}$ mm Hg.

The metallization process is carried out by a standard flash metallization.

The following Examples illustrate the invention:

EXAMPLES

Example 1

Non-reactive novolac phenolic resin SFP 118 (40 parts) by weight was blended with the epoxy resin Araldite GT 7203 (60 parts by weight), Rutapox VE 2600 catalyst (0.24 parts by weight) and benzoine (0.40 parts by weight). The mixture was extruded hot through a twinfeed extruder at a temperature at which the blend is melted. The extrudate was allowed to cool and solidify. The solid mass was pulverised in a hammer mill. The granulometry of the powder obtained was determined on an "Alpine" apparatus. The powder contains 3 to 7% of particles of diameter greater than 80 microns, 10–18% of particles of diameter greater than 63 microns and 60–75% of particles of diameter greater than 32 microns.

Example 2–13

The compositions of Examples 2–4 were prepared by the process described in Example 1 along the amounts of phenolic resin and epoxy resin given in Table 1 below and using Rutapox VE 2600 catalyst (0.24 parts by weight) and benzoine (0.40 parts by weight).

| Examp No. | Phenolic Resin | Pts | Epoxy Resin | Pts |
|---|---|---|---|---|
| 2 | Alnoval PN 320 | 40 | Araldite GT 7203 | 60 |
| 3 | Alnoval PN 320 | 50 | Araldite GT 7203 | 50 |
| 4 | Alnoval PN 320 | 60 | Araldite GT 7203 | 40 |
| 5 | Alnoval PN 320 | 40 | Der 6630 | 60 |
| 6 | Alnoval PN 320 | 50 | DER 6630 | 50 |
| 7 | Alnoval PN 320 | 60 | DER 6630 | 40 |
| 8 | Alnoval PN 320 | 40 | Araldite GT 7072 | 60 |
| 9 | Alnoval PN 320 | 50 | Araldite GT 7072 | 50 |
| 10 | Alnoval PN 320 | 60 | Araldite GT 7072 | 40 |
| 11 | Alnoval PN 320 | 40 | Araldite GT 6097 | 60 |
| 12 | Alnoval PN 320 | 50 | Araldite GT 6097 | 50 |
| 13 | Alnoval PN 320 | 60 | Araldite GT 6097 | 40 |

Example 14

The compositions of Examples 1 to 13 can be used to prepare a metallized headlamp reflector with a metal housing.

A metal headlamp parabola was degreased with alkali and rinsed with demineralised water. The cleaned parabola was then passed through a zinc phosphate solution, rinsed and dried in an oven at about 120° C. The dried parabola was then coated with the composition using an electrostatic gun. The coated parabola was heated to 220°–230° C. for 20 mins to cure the coating.

The metal layer is deposited by vacuum metallization. The parabola with the cured coating was placed into a vacuum chamber and the chamber evacuated. A block of aluminium in the chamber was caused to sublime by the application of heat using an electric current. The sublimed aluminium deposited on the pararbola.

Example 15

The compositions of Examples 1 to 13 can be used to prepare a metallized headlamp reflector with a housing prepared from conducting sheet moulding compound (SMC).

The parabola is cleaned with a hydrocarbon solvent, toluene or xylene or by U.V. irradiation. The cleaned parabola is preheated to 220° C. for 30 minutes and cooled to 40° C. The powder is applied by electrostatic spray and cured as described in Example 14. The aluminium layer is deposited also as described in Example 14.

We claim:

1. A coating composition suitable for use in preparing a metallized article comprising from 30–70% by weight of a novolac-type phenolic resin of melting point in the range of 70°–130° C. and from 70–30% weight of a multi-epoxy group containing compound having an epoxide equivalent weight of 100 to 1200.

2. A composition according to claim 1 where the epoxy group containing compound is epoxy compound which has an epoxide equivalent weight of 605 to 645 and a softening point of 59° to 65° C.

3. A composition according to claim 1 where the epoxide compound is based on bis-phenol A and epichlorhydrin.

4. A composition according to claim 1 wherein the novolac-type resin has a melting point of 80°–100° C.

5. A composition according to claim 1 and containing a catalyst for the reaction between the phenolic resin and the epoxide.

6. A coating composition according to claim 1 wherein the epoxy compound is an epoxy-resin which is the reaction product of bis-phenol A and epichlorohydrin having an epoxide equivalent weight of 605 to 645 and a softening point of 59° to 65° C. and the novolac-type resin has a melting point of 83°–88° C.

* * * * *